US006666947B2

(12) United States Patent
Lim et al.

(10) Patent No.: US 6,666,947 B2
(45) Date of Patent: Dec. 23, 2003

(54) METHOD FOR PRODUCING AN INKJET PRINTHEAD ELEMENT; AND AN INKJET PRINTHEAD ELEMENT

(75) Inventors: Kok Leong Lim, Singapore (SG); Seng Thye Raymond Go, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

(21) Appl. No.: 09/773,313

(22) Filed: Jan. 31, 2001

(65) Prior Publication Data

US 2002/0100551 A1 Aug. 1, 2002

(51) Int. Cl.[7] .................................................. C09J 5/06

(52) U.S. Cl. .................... 156/326; 156/324.4; 156/330; 438/21; 29/890.1; 216/27

(58) Field of Search ................................ 156/326, 330, 156/324.4, 320; 29/890.1; 347/65; 216/27; 438/21

(56) References Cited

U.S. PATENT DOCUMENTS 4,953,287 A * 9/1990 West et al. ................ 156/285
5,198,834 A * 3/1993 Childers et al. .............. 347/65
5,930,895 A * 8/1999 Orikasa et al. ............... 29/464
6,007,188 A * 12/1999 MacLeod et al. ............. 347/65
6,054,011 A 4/2000 Radke et al.
6,077,382 A * 6/2000 Watanabe ................... 156/322

FOREIGN PATENT DOCUMENTS

JP 07312377 A * 11/1995 ........... H01L/21/60

OTHER PUBLICATIONS

Derwent abstract of JP 07312377 A.*

* cited by examiner

*Primary Examiner*—Jeff H. Aftergut
*Assistant Examiner*—John L. Goff

(57) ABSTRACT

A method for producing an inkjet printhead element comprises providing a thinfilm die and a barrier layer thereon, wherein the barrier layer comprises a thermoplastic component and a thermoset component. The barrier layer is heated such that the barrier layer becomes tacky. The orifice plate is aligned to the barrier layer and is brought into contact with the barrier layer. Here, the orifice plate is held in place on the barrier layer by the tackiness of the barrier layer. Finally, the assembly of the thin film die, the barrier layer and the orifice plate is subjected to a stake and bake process to attach the orifice plate permanently to the barrier layer and, hence, to the thin film die.

13 Claims, 4 Drawing Sheets

METHOD FOR PRODUCING AN INKJET PRINTHEAD ELEMENT; AND AN INKJET PRINTHEAD ELEMENT

BACKGROUND OF THE INVENTION

The invention relates to a method for producing an inkjet printhead element and an inkjet printhead element produced using said method.

Inkjet printheads generally comprise two members, the thinfilm die and the metal orifice plate. These members are generally manufactured separately and are subsequently brought together to form a unified inkjet printhead element. Traditionally, the attachment of the thinfilm die to the metal orifice place has been accomplished via an ink barrier layer on the thinfilm die. In the attaching process, dollops of glue are dispensed to temporarily tack the orifice plate in position before the thinfilm die and the orifice plate are permanently secured to one another by performing a so-called "stake and bake" procedure.

The process of attaching the thinfilm die to the orifice plate using dispensed glue has, however, been fraught with problems. It is for example very difficult to control the size and the position of the glue which is dispensed. Another grave problem which occurs is that the orifice plate, temporarily tacked in place on the liquid glue, slides laterally on the layer of liquid glue relative to the thinfilm die prior to being permanently affixed in the staking process. This shifting leads to improper alignment of the orifice plate on the thinfilm die in the staking process.

Generally, the inability to control the size of the dispensed glue dollops leads to a lifting of the corner of the orifice plate from the thinfilm die if too much glue is used, or complete separation of the orifice plate from the thinfilm die in the case that too little glue is used. Furthermore, the inability to control the positioning of the dispensed glue leads to the existence of glue in unintended locations on the thinfilm die and/or on the orifice plate, a situation leading to problematic smearing of the glue. This either worsens print quality or, in extreme cases, leads to rejection of the printhead, thereby increasing production costs.

U.S. Pat. No. 6,054,011 discloses an orifice plate with a layer of metal, for example gold, bonded thereto and an ink barrier layer. An adhesion promoter glue is provided between the ink barrier layer and a metal oxide layer which itself is applied to the metal layer which is bonded to the orifice plate. The orifice plate is therefore held to the ink barrier layer via the direct adhesion contact between the metal oxide layer and the adhesion promoter glue. According to this document, the orifice plate and the ink barrier layer are assembled by compressing the orifice plate, coated as indicated above, to the ink barrier with the polymeric adhesion promoter there between at a pressure of about 150 psi (105,555 kg/m$^2$) at a temperature of about 200° C. for about 10 minutes. Following compression and heating as above, the ink barrier layer-orifice plate assembly is heated (with the adhesion promoter glue there between) at a temperature of about 220° C. for about 30 minutes.

A problem with existing glue-based processes is that when the orifice plate, following temporary tacking to the thinfilm die, is subjected to the stake process at 150° C., the glue used for temporarily tacking melts and causes misalignment of the orifice plate on the thinfilm die. This can lead to smearing of glue if the amount and/or position of the glue is not correct.

SUMMARY OF THE INVENTION

It is therefore a goal of the present invention to produce an inkjet printhead element in which in which the final alignment of the orifice plate on the thinfilm die is improved.

This goal is met by providing a method for producing an inkjet printhead element comprising the features recited according to the independent claim.

A method for producing an inkjet printhead element comprises providing a thinfilm die and a barrier layer thereon, wherein the barrier layer comprises a thermoplastic component and a thermoset component. The barrier layer is heated such that the barrier layer becomes tacky. The orifice plate is aligned to the barrier layer and is brought into contact with the barrier layer. Here, the orifice plate is held in place on the barrier layer by the tackiness of the barrier layer. Finally, the assembly of the thinfilm die, the barrier layer and the orifice plate is subjected to a stake and bake process to attach the orifice plate permanently to the barrier layer and, hence, to the thinfilm die.

A major advantage of the inventive method as recited above is that no glue is used in the barrier layer for temporarily tacking the orifice plate to the thinfilm die. The barrier layer is heated just enough to reach the glass transition temperature of its thermoplastic component. The thermoplastic component of the barrier layer becomes highly amorphous such that the entire surface of the barrier layer becomes sticky to the touch. This stickiness will subsequently hold the orifice plate in place when the orifice plate is placed on top of the barrier layer.

Adhesion in the inventive method recited above takes place directly between the orifice plate and the barrier layer, i.e. no glue is needed, the temporary adhesion of the orifice plate on the barrier layer prior to curing instead depending on the tackiness of the barrier layer upon reaching its glass transition temperature $T_g$. Since the orifice plate is directly contacted lightly to the already tacky barrier layer instead of using glue to temporarily tack the orifice plate, the danger of glue being squeezed out from in between the orifice plate and the barrier layer into undesired regions is essentially eliminated. This leads to a lower reject ratio, thereby streamlining and economizing the entire production process.

The fact that the orifice plate is directly tacked to the barrier layer offers greater resistance to a shifting of the orifice plate on the barrier layer prior to staking and/or curing the orifice plate on the barrier layer. This means that proper alignment of the orifice plate on the barrier layer can be controlled to be more precise and more reproducible in the absence of the shifting of the orifice plate and the barrier layer relative to one another.

The method according to the invention as recited above comprises two heating phases.

The first of these two heating phases is intended to prepare the barrier layer for the subsequent contacting of the orifice plate, and therefore takes place prior to such contacting. During this first of two heating phases, the barrier layer is heated to within approximately 2% of the glass transition temperature of its thermoplastic component. This first heating phase is therefore not intended to liquefy the entire barrier layer but rather only to render one of the barrier layer's components, the thermoplastic component, highly amorphous so that the entire surface of the barrier layer becomes tacky to the touch. Since it is not intended that the barrier layer be melted prior to contacting the orifice plate on the barrier layer, the heating conditions to which the barrier is subjected in this first heating phase can and, advantageously, should be kept gentle. Especially characteristic of the gentleness of this first heating phase is the fact that the heating of the barrier layer to only its approximate glass transition temperature can be accomplished very quickly. Once the approximate glass temperature of the thermoplastic component of the barrier layer is reached, an orifice plate can be contacted with the (now tacky) barrier layer.

Between the two heating phases, the orifice plate is first aligned with the barrier layer with which it is to be brought in contact and is then brought in contact with the (tacky) barrier layer. The danger of glue being displaced from in between the barrier layer and the orifice plate during the process of contacting the orifice plate to the barrier layer is essentially ruled out by two characteristic features of the invention:

a) The barrier layer is merely tacky and is not in liquid form, so that it cannot flow into unintended regions, and b) The contacting of the orifice plate to the barrier layer is itself accomplished very gently, preferably by merely touching the orifice plate to the barrier layer; the tackiness of the barrier layer engendered during the first heating phase as described above is sufficient to hold the incoming orifice plate securely, thereby obviating any active compression of the orifice plate onto the barrier layer. It is such active compression which is in part responsible for the undesired displacement of adhesion material in other related methods in the prior art.

The second heating phase of the method according to the invention is carried out following the contacting of the orifice plate to the barrier layer by a stake process at a pressure of 150 psi and a temperature of 200° C. and then a bake process of 200° C. for 20–30 min to set the thermoset component of the barrier layer. During this second heating phase, the duration of which will depend on the time necessary for the particular thermoset component used in the barrier layer to cure, the orifice plate therefore becomes permanently attached to the thinfilm die via the interposed barrier layer.

DESCRIPTION OF PREFERRED EMBODIMENTS OF THE INVENTION

The invention will now be described in detail with reference to the figures.

Figure 1:
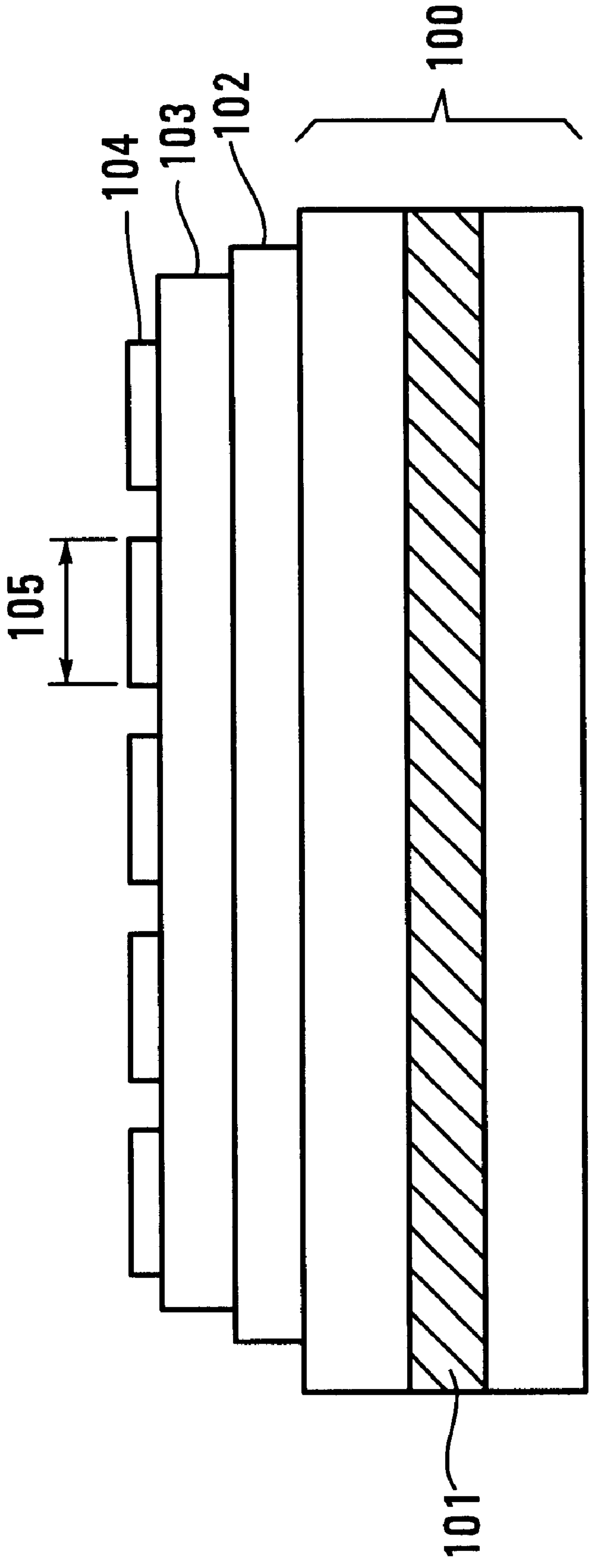
FIG. 1 shows a schematic diagram of a preferred embodiment of an apparatus for producing an inkjet printhead element according to the method of the invention.

FIG. 1 shows a heating wafer chuck 100, a heating element 101 of the heating wafer chuck 100, a wafer frame 102, a thinfilm wafer 103 comprising a plurality of thinfilm die regions 105 and a plurality of barrier layers 104, each of which rests on a respective thinfilm die region 105. A thinfilm die 105 is defined by the region of the thinfilm wafer 103 covered by a barrier layer 104. It is important for effectively executing the method according to the invention that the wafer 102 be in conductive thermal contact with the heating wafer chuck 100, that the thinfilm wafer 103 be in conductive thermal contact with the wafer frame 102, and that the respective barrier layers 104 composed of a thermoplastic component and a thermoset component are each in conductive thermal contact with the thinfilm wafer 103 via a respective region 105 designating the region of the thinfilm die. A preferred material for the thermoplastic component of the barrier layer is poly(methylmethacrylate) (PMMA) and a preferred material for the thermoset component of the barrier layer is an epoxy compound. The heating element 101 of the heating wafer chuck 100 is preferably controlled electrically (electrical contacts not shown here), and is preferably made of a material which allows rapid heating to a desired temperature. Furthermore, the wafer frame 102 is preferably made of a material which can effectively, i.e. rapidly, conduct heat from the heating wafer chuck 100 into the thinfilm wafer 103 so that this heat may ultimately be transmitted, through each of the thinfilm die regions 105, to each of the corresponding barrier layers 104. In this way, a respective barrier layer 104 can rapidly be rendered tacky by heating to the glass transition temperature of its thermoplastic component.

Figure 2:
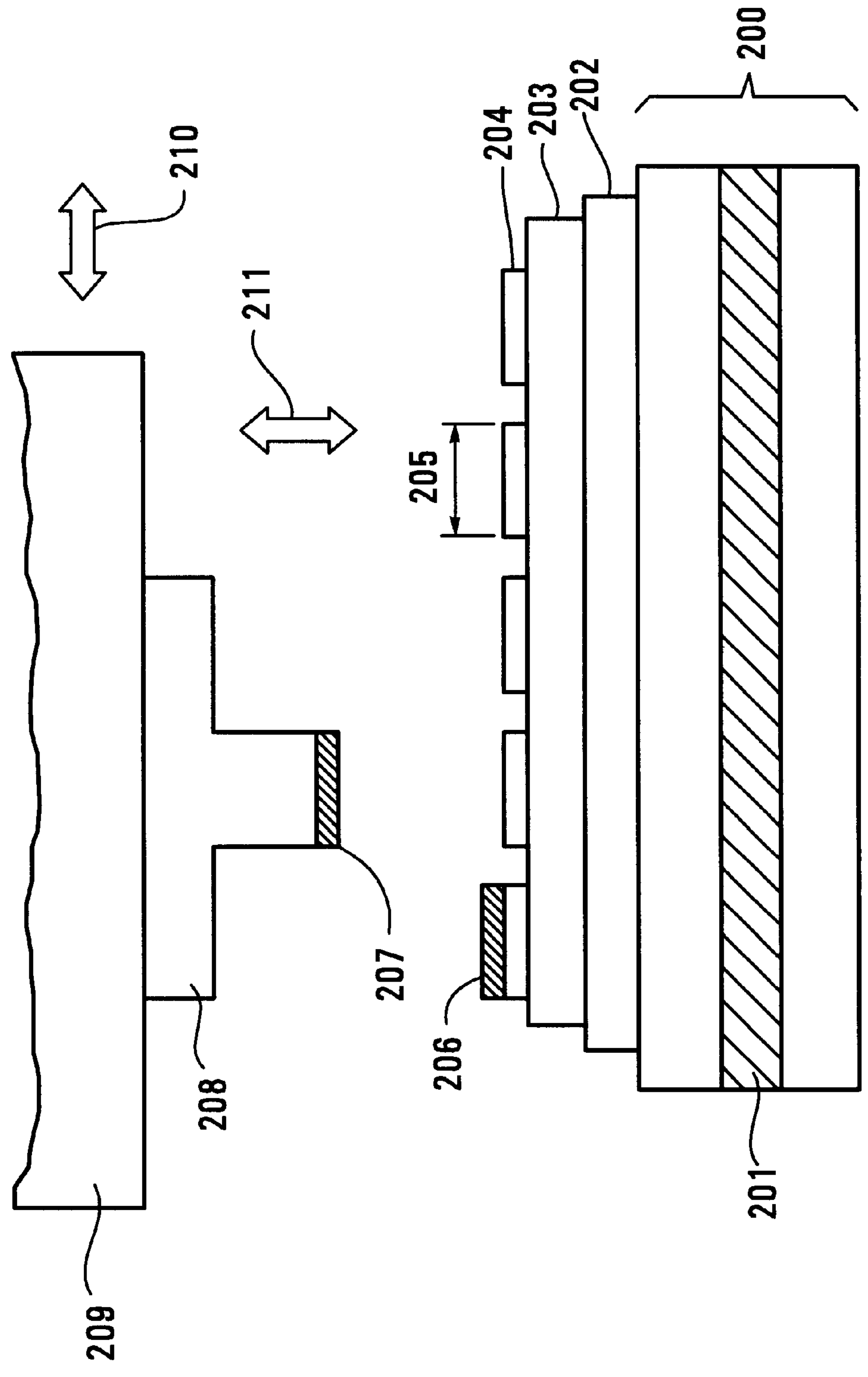
FIG. 2 shows an intermediate process step during the production of a plurality of inkjet printhead elements according to a preferred embodiment of the method of the invention.

FIG. 2 shows a heating wafer chuck 200, a heating element 201 of the heating wafer chuck 200, a wafer frame 202, a thinfilm wafer 203 with a plurality of thinfilm dies 205 upon each of which a barrier layer 204 is located. A thinfilm die 205 is defined by the region of the thinfilm wafer 203 covered by a barrier layer 204. FIG. 2 shows an intermediate step in the production of a plurality of inkjet printhead elements on a single thinfilm wafer 203. In this figure, one orifice plate 206 has already been brought into contact with the tacky barrier layer 204 and another orifice plate 207 has yet to be brought into contact with a barrier layer 204. The orifice plate 207 will be brought into contact with a barrier layer 204 using a place chuck 208 which carries the orifice plate 207 to its intended location on a barrier layer 204. The place chuck 208 is positioned by using a positioning apparatus 209, shown here in cutaway. The positioning apparatus 209 is capable of moving relative to a given barrier layer 204 in the lateral directions indicated by the double-headed arrow 210 as well as in the vertical directions indicated by the double-headed arrow 211.

According to a preferred embodiment of the invention, the orifice plate 207 is aligned to the barrier layer 204 based on a visual correlation of the position of the place chuck 208 which holds the orifice plate 207 and/or of the orifice plate itself 207 relative to the position of the (already tacky) barrier layer 204 on the thinfilm die 203. In this way, a precise and, hence, reproducible placement of the orifice plate 207 onto the barrier layer 204 is made possible.

According to a preferred embodiment of the method according to the invention, the visual correlation is accomplished by optical imaging or by electronic imaging of the place chuck 208 and/or of the orifice plate 207 itself relative to the barrier layer 204, wherein an especially preferred mode of electronic imaging is that performed using a CCD (charged coupled device) camera.

It should be noted here that the movement of the positioning apparatus 209 is of such a nature as to allow the place chuck 208 to lightly bring the orifice plate 207 into contact with an intended barrier layer 204. That is to say that, due to the tacky nature of the intended barrier layer 204, very little pressure needs to be exerted via the place chuck 208, itself driven by the positioning apparatus 209.

As explained above for FIG. 2, the arrows 210 and 211 can be understood as indicating the direction of movement of the positioning apparatus 209 and, hence, that of the place chuck 208 and the orifice plate 207, relative to a barrier layer 204 which, due to its being mounted on a stationary heating wafer chuck 200, is itself also stationary.

It is, however, also within the scope of the invention that the arrows 210 and 211 in FIG. 2 can represent the directions of movement of the heating wafer chuck 200 mounted on the positioning apparatus of its own relative to a stationary place chuck 208 and, hence, stationary orifice plate 207. In such a scenario, one can dispense with the positioning apparatus 209 to drive the place chuck 208.

Arrows 210 and 211 can also be understood to represent the movement of both the heating wafer chuck 200 and the positioning apparatus 209 relative to one another until proper alignment of the orifice plate 207 with the intended barrier layer 204 is achieved. Such a movement of both the heating wafer chuck 200 and the positioning apparatus 209 is of such a nature that, during this movement, each of their positions changes with respect to a given point in the stationary frame of the room in which the production is performed.

However, since in most practical applications the thinfilm wafer 203 will comprise a plurality of thinfilm die regions 205, each with a corresponding barrier layer 204, it will prove most expedient in the majority of cases to keep the heating wafer chuck 200 stationary and to render the place chuck 208 mobile so that the latter is free to retrieve new orifice plates 207 from a location remote to the thinfilm wafer 203, returning after each retrieval to bring the retrieved orifice plate 207 into contact with a free (i.e. as yet bearing no orifice plate 206) barrier layer 204.

As in FIG. 1, the heating element 201 of the heating wafer chuck 200 is advantageously controlled so as to allow rapid and precise adjustment to a desired temperature. This will normally be achieved by some means of electrical control (not shown).

According to a further embodiment of the method of the invention, bringing the orifice plate 207 in contact with the barrier layer 204 comprises staking the orifice plate 207 to the barrier layer 204. Such a staking process benefits from the fact that the entire barrier layer 204 in its tacky state is used to immobilize the orifice plate 207 subsequent to the orifice plate's 207 being brought in contact with the barrier layer 204. In this way, between the time of bringing the orifice plate 207 into contact with the barrier layer 204 and the time of staking the orifice plate 207 to the barrier layer 204, minimal shifting of the orifice plate 207 on the barrier layer 204 takes place.

According to a preferred embodiment of the method as recited above, the barrier layer 204 is composed of the material IJ5000 (DuPont), for which the thermoplastic temperature is about 90° C. and the thermoset temperature is about 200® C. Using this material, a thermoplastic temperature of about 90° C. can be reached within a matter of seconds using the heating wafer chuck 200, at which point the material IJ5000 becomes tacky to the touch. Following contacting the orifice plate 207 to the barrier layer 204, further treatment at the thermoset temperature, i.e. the temperature at which the thermoset component of the barrier layer 204 cures, permanently attaches the orifice plate 207 to the barrier layer 204. Here as well, a staking procedure can precede the treatment at the thermoset temperature. For the material IJ5000, the thermoset temperature is about 200° C., and heating the assembly of the thinfilm die 203, the barrier layer 204 and the orifice plate 207 at about this temperature takes place for about 20–30 minutes.

It is important that the thermoplastic component and the thermoset component of the barrier layer 204 are mutually compatible, i.e. that the thermoplastic component and the thermoset component can be mixed with one another to form a homogeneous material and, therefore, a uniform barrier layer composition. Regions of nonuniformity throughout the barrier layer 204 might be expected to result from an inhomogeneous mixing of the thermoplastic component with the thermoset component of the barrier layer 204 and would be expected to decrease the overall adhesion and/or curing aptitude of the barrier layer 204.

As mentioned above, a thinfilm die according to such an embodiment is defined by the region of the thinfilm wafer 203 covered by a barrier layer 204. In this way, production of multiple inkjet printhead elements can take place in a single production run during which the place chuck 208 places one orifice plate 206, 207 after the next on each of the plurality of barrier layers 204 of the thinfilm wafer 203. Following production of the plurality of inkjet printhead elements on a single thinfilm wafer 203, the individual inkjet printhead elements can be separated from the surrounding region of the thinfilm wafer 203 and can be further used in the production of an inkjet printhead.

Figure 3A:
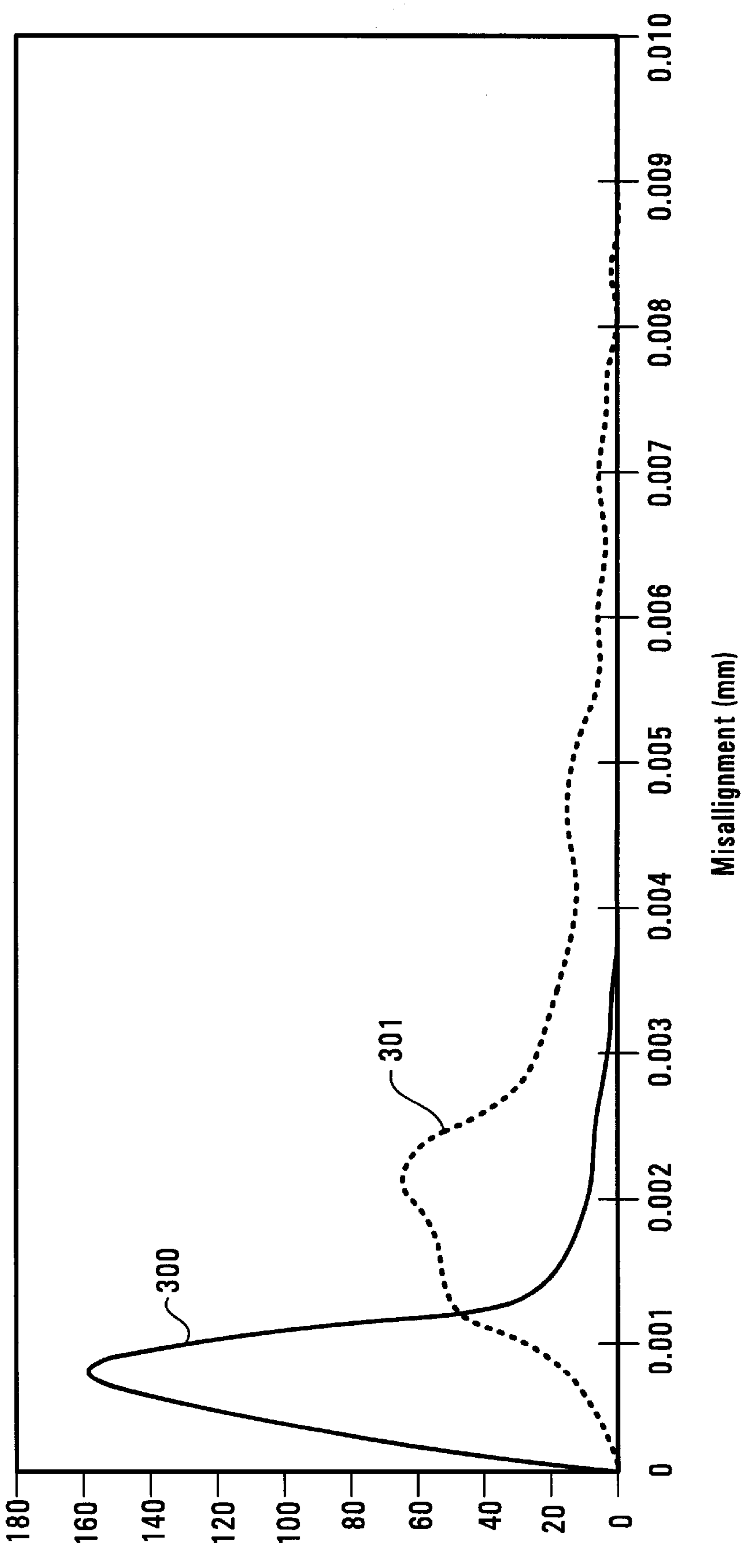
FIG. 3 shows two graphs in which the pre-stake misalignment and the post-stake misalignment are compared for methods for producing inkjet printhead elements in the prior art (FIG. 3*a*) and for the glueless method for producing an inkjet printhead element according to the invention (FIG. 3*b*).
Figure 3B:
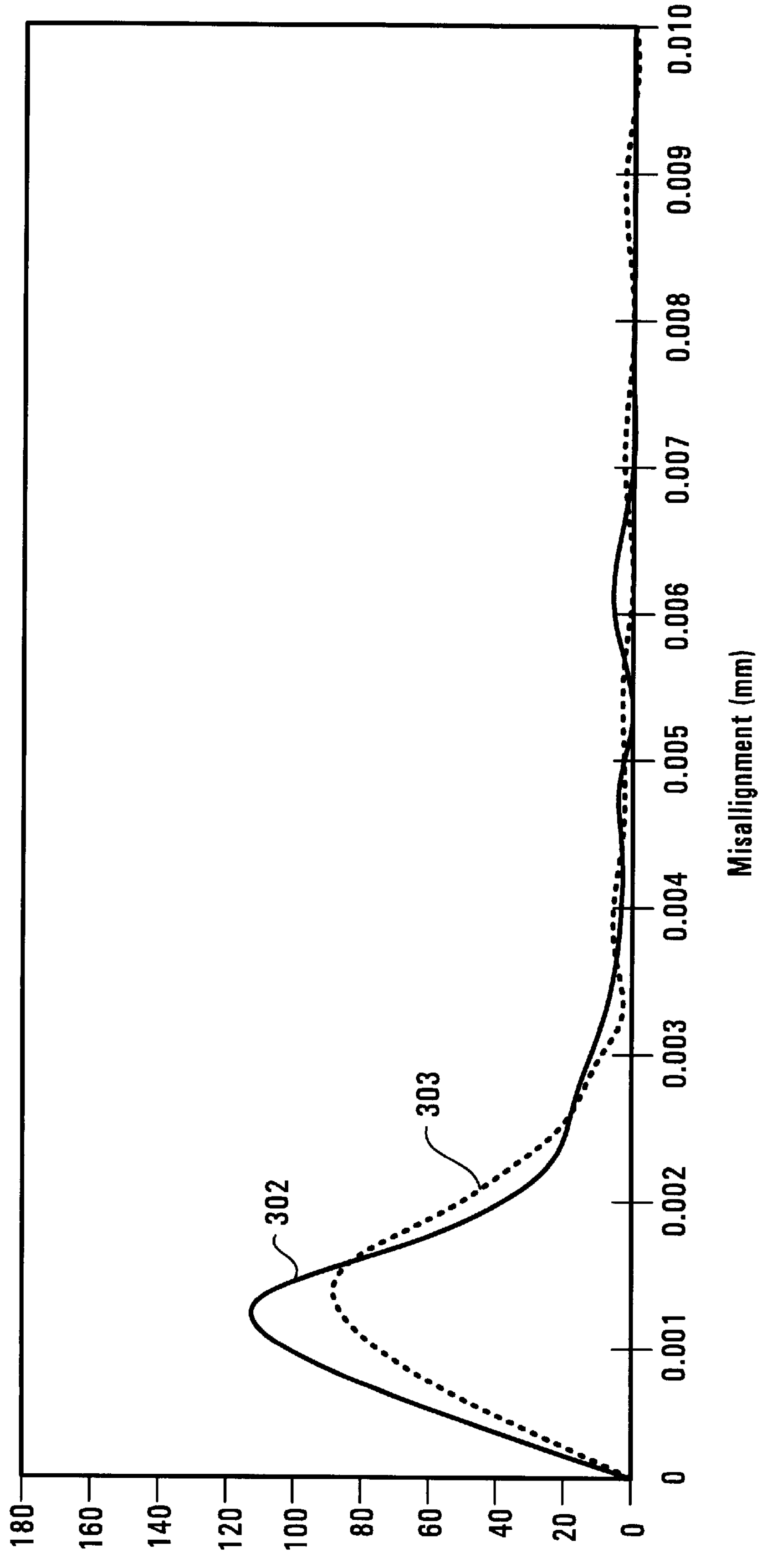

FIG. 3 shows two graphs, FIG. 3*a* and FIG. 3*b*, depicting the pre- and post-stake misalignment for existing and for the inventive processes of attaching an orifice plate, respectively.

In FIG. 3*a*, one sees a unimodal peak corresponding to a misalignment, taking place prior to the stake process, of about 1 micron. In contrast thereto, one sees in curve 300 for the post-stake misalignment (curve 301) a multimodal distribution of extents of misalignment, in which the maximum (i.e. for the greatest number of thinfilm dies tested) misalignment is 2.5 microns. This 2.5 micron misalignment indicates the distance by which an orifice plate is offset from its ideal position of perfect alignment on a barrier layer/thinfilm die. Both the magnitude of this offset, i.e. about 2.5 microns as well as the statistical multimodality of the distribution of the offsets obtained with respect to the number of dies sampled imply a high degree of uncertainty in existing glue-based methods for producing inkjet printhead elements. This uncertainty ultimately manifests itself as an undesirable lack of reproducibility in the production of such inkjet printhead elements.

FIG. 3*b* shows the corresponding pre-stake misalignment (curve 302) and post-stake misalignment (curve 303) of the orifice plate relative to its proper position on the barrier layer for the method of the invention. The pre-stake misalignment in FIG. 3*b* (curve 302) exhibits, as in FIG. 3*a*, an essentially unimodal distribution. As with the results for the pre-stake misalignment depicted in FIG. 3*a*, the essentially unimodal distribution for the pre-stake misalignment in FIG. 3*b* also centers on approximately 1 micron. The post-stake misalignment shown in FIG. 3*b* (curve 303), however, is radically different from that of FIG. 3*a*. The statistical distribution of the post-stake misalignment results obtained with the method of the present invention define an essentially unimodal distribution centering on about 1.5 microns of misalignment distance of the orifice plate on the barrier layer. This represents an approximately 40% better post-stake alignment as compared to the maximum post-stake alignment value of FIG. 3*a* (i.e. about 2.5 microns).

In addition, one notes that the post-stake misalignment curve 303 of FIG. 3*b* not only mirrors the statistical center of mass of the pre-stake misalignment curve of FIG. 3*b* to a greater extent than is seen in FIG. 3*a*, but is also much more closely superimposed with the general shape of the pre-stake misalignment curve 302 of FIG. 3*b* than is the case for the two curves of FIG. 3*a*. This means that the method according to the invention as recited above is capable of greatly stabilizing the position of the orifice plate on the barrier layer following contacting but prior to staking the orifice plate on the barrier layer. This stabilization is due to the large resistive force restricting the lateral movement of the orifice plate relative to the barrier layer after the two have been brought in contact. This large restrictive force relative to existing glue-based production methods is attributable to the fact that the entire barrier layer is used in a thermally activated, i.e. tacky or sticky, form to hold the contacted orifice plate firmly in place.

As demonstrated by a comparison of the results in FIG. 3*a* with those of FIG. 3*b* it becomes clear that the present method for producing an inkjet printhead element is capable of generating highly reproducible orifice plate-barrier layer assemblies in a well-aligned fashion. The minimal misalignment of the orifice plate relative to the barrier layer in these assemblies make them extremely amenable to demanding printing applications such as increased resolutions and print speeds.

List of Reference Numbers

100 heating wafer chuck
101 heating element of heating wafer chuck
102 wafer frame
103 thinfilm wafer
104 barrier layer
105 region designating thinfilm die
200 heating wafer chuck
201 heating element of heating wafer chuck
202 wafer frame
203 thinfilm wafer
204 barrier layer
205 region designating thinfilm die
206 orifice plate tacked to barrier layer 204
207 orifice plate not yet tacked to barrier layer 204
208 place chuck carrying orifice plate 207
209 positioning apparatus (in cutaway)
210 horizontal direction of movement
211 vertical direction of movement
300 pre-stake misalignment curve in prior art method
301 post-stake misalignment curve in prior art method
302 pre-stake misalignment curve in method of invention
303 post-stake misalignment curve in method of invention

What is claimed is:

1. A method for assembling an inkjet printhead, comprising:

providing a thinfilm die with a barrier layer comprising a thermoplastic component and a thermoset component;

prior to bringing an orifice plate in contact with the barrier layer, heating the barrier layer in a first heating step such that the barrier layer becomes tacky but not liquid;

aligning an orifice plate to the tacky barrier layer;

prior to staking and baking an assembly of the thinfilm die, the barrier layer and the orifice plate, bringing the orifice plate in contact with the tacky barrier layer, whereby the orifice plate is held in place on the barrier layer by the tackiness of the barrier layer thereby bonding together the thinfilm die, the barrier layer and the orifice plate; and staking and baking the assembly of the thinfilm die, the barrier layer and the orifice plate in a second heating step, whereby the orifice plate becomes permanently attached to the barrier layer by a baking and curing of said thermoset component.

2. The method of claim 1, wherein the thinfilm die is mounted in a heating wafer chuck such that the thinfilm die is in conductive thermal contact with the heating wafer chuck, so that the heating steps are performed by heating the wafer chuck.

3. The method of claim 2, wherein the aligning of the orifice plate is carried out based on a visual correlation of the position of a place chuck which holds the orifice plate and/or of the orifice plate itself relative to the position of the barrier layer of the thinfilm die.

4. The method of claim 3, wherein the visual correlation is accomplished by optical imaging or by electronic imaging of the place chuck and/or of the orifice plate.

5. The method of claim 4, wherein the electronic imaging is performed using a CCD (charged coupled device) camera.

6. The method of claim 1, wherein poly methylmethacrylate is used as the thermoplastic component of the barrier layer.

7. The method of claim 1, wherein an epoxy compound is used as the thermoset component of the barrier layer.

8. The method of claim 1, wherein the barrier layer is composed of a material with a thermoplastic temperature of about 90° C. and a thermoset temperature of about 200° C.

9. The method of claim 8, wherein baking the assembly includes baking the assembly of the thinfilm die, the barrier layer and the orifice plate at the thermoset temperature.

10. The method of claim 1, wherein the thinfilm die is one of a plurality of thinfilm dies on a thinfilm wafer.

11. The method of claim 1, wherein heating the barrier layer includes heating the barrier layer to within 2% of a glass transition temperature of the thermoplastic component of the barrier layer.

12. The method of claim 1, wherein baking the assembly includes baking the assembly of the thinfilm die, the barrier layer and the orifice plate in the second heating step to a temperature sufficient to cure the thermoset component of the barrier layer.

13. A method of manufacturing an inkjet printhead without using drops of glue, comprising:

placing a barrier layer between an inkjet orifice plate and an inkjet thinfilm die, wherein said barrier layer comprises a thermoplastic part and a thermoset part;

heating said barrier level to a first temperature that approximates the glass transition temperature of said thermoplastic part such that it becomes tacky but not liquid;

aligning and tacking together said inkjet orifice plate and inkjet thinfilm die by bringing them into contact with one another and with said barrier layer in between, and such that lateral slipping is thereafter prevented; and staking together at a pressure and heating to a second temperature for a baking time such that said thermoset part cures and permanently bonds together said inkjet orifice plate and inkjet thinfilm die.

* * * * *